(12) United States Patent
Shimizu

(10) Patent No.: US 6,982,698 B2
(45) Date of Patent: Jan. 3, 2006

(54) LCD DUSTPROOF STRUCTURE OF ELECTRONIC EQUIPMENT AND ELECTRONIC APPARATUS HAVING THE STRUCTURE

(75) Inventor: Masahito Shimizu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/979,219

(22) Filed: Nov. 3, 2004

(65) Prior Publication Data

US 2005/0141186 A1    Jun. 30, 2005

(30) Foreign Application Priority Data

Dec. 25, 2003  (JP)  ............................. 2003-430574

(51) Int. Cl.
*G09G 5/00* (2006.01)
(52) U.S. Cl. ...................... 345/156; 348/794; 445/90.3
(58) Field of Classification Search ................ 345/156, 345/905; 348/794; 361/681; 445/90.3, 445/575.1
See application file for complete search history.

(56) References Cited

U.S. PATENT DOCUMENTS

| | | | |
|---|---|---|---|
| 5,400,160 A | | 3/1995 | Takahashi et al. |
| 6,375,328 B2 * | | 4/2002 | Hashizume et al. .......... 353/30 |
| 6,540,360 B2 * | | 4/2003 | Furuhata et al. .............. 353/31 |
| 6,731,913 B2 * | | 5/2004 | Humphreys et al. ....... 455/90.3 |
| 6,777,632 B1 * | | 8/2004 | Tamaki et al. ........... 200/302.3 |

FOREIGN PATENT DOCUMENTS

| | | |
|---|---|---|
| JP | 9-127491 | 5/1997 |
| JP | 09-127491 | 5/1997 |
| JP | 2003-43479 | 2/2003 |

OTHER PUBLICATIONS

Copy of European Search Report dated Apr. 19, 2005.

* cited by examiner

*Primary Examiner*—Ricardo Osorio
(74) *Attorney, Agent, or Firm*—Dickstein, Shapiro, Morin & Oshinsky, LLP.

(57) ABSTRACT

The present invention provides an LCD dustproof structure which corresponds to dustproof and impact absorption by one cushion and is easily assembled and an electronic apparatus having the structure.

A board protruding portion extending to right and left is set in the width direction of an LCD flexible board, an LCD flexible board catching face contacting with the downside of the board protruding portion of the LCD flexible board is formed on an LCD frame, when assembled, the downside of the board protruding portion of the LCD flexible board contacts with the LCD flexible board catching face, so that the board protruding portion and the upside of the LCD flexible board constitute planes continued with the face of a cushion striking portion. Thereby, it is possible to secure the dustproof of the space between a screen and an LCD body only by a dustproof cushion and at the same time, the cushion serves as an impact absorbing cushion.

10 Claims, 4 Drawing Sheets

F I G. 1
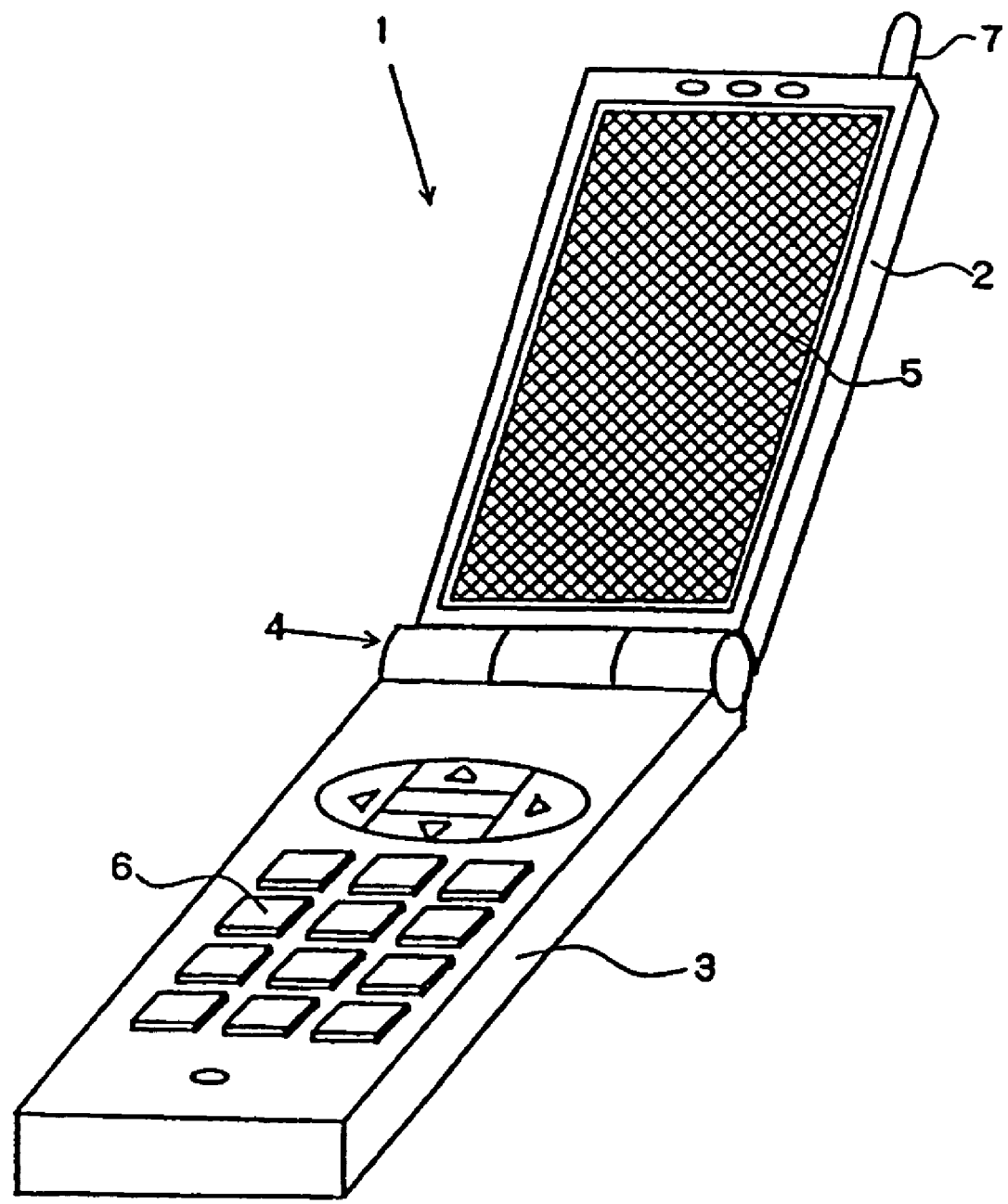

Section A - A

LCD DUSTPROOF STRUCTURE OF ELECTRONIC EQUIPMENT AND ELECTRONIC APPARATUS HAVING THE STRUCTURE

BACKGROUND OF THE INVENTION

1. Field of the Invention

The present invention relates to an LCD dustproof structure and an electronic apparatus having the LCD dustproof structure.

2. Description of the Prior Art

Conventionally, an electronic apparatus having an LCD such as a cellular phone is constituted by holding an LCD frame to the both sides between a front case for forming a housing and a rear cover. An LCD connecting with an LCD flexible board and a printed wiring board serving as a circuit board is fixed in an LCD frame. A screen for displaying an LCD picture is set to the front case. In the case of the conventional configuration, because there is a space between the LCD frame and an LCD flexible board, a structure is used in which an impact absorbing cushion is set between the LCD frame and the front case and moreover, a dustproof cushion is set between the LCD body and the screen when using a dustproof structure.

Moreover, a liquid-crystal display having functions for impact absorption and dustproof packing is disclosed (refer to Patent Document 1). In the liquid-crystal display, a fixing member for fixing a liquid-crystal display unit to a printed circuit board is formed by a high-elasticity and flexible resin material, and the upside of the fixing member is brought into contact with a housing which has an window.

[Patent Document 1] Japanese Patent Laid-Open No. 9-127491.

BRIEF SUMMARY OF THE INVENTION

An electronic apparatus having an LCD such as a conventional cellular phone requires a dustproof cushion for dustproof between an LCD body and a front case in addition to an impact absorbing cushion. Because the dustproof cushion contacts with the LCD body, there are problems that it is necessary to consider influences on the LCD body having a low rigidity and thereby, extra man hour for assembling is required due to poor workability.

Moreover, in the case of the liquid-crystal display disclosed in Patent Document 1, because the quality of a fixing portion material is made flexible, the flexibility is limited and a problem lies in the fact of obtaining desired impact moderating characteristic and dustproof characteristic.

It is an object of the present invention to provide an LCD dustproof structure easily assembled correspondingly to dust proof and impact absorption by a cushion and an electronic apparatus having the dustproof structure.

An LCD dustproof structure of the present invention is an LCD dustproof structure of an electronic apparatus including a first case having a display face and an LCD and a second case engaged with the first case to form a housing, wherein an LCD frame that carries the LCD, a printed wiring board having an electronic component and a wiring for controlling the LCD and an LCD flexible board for connecting the LCD with the printed wiring board is fixed to the first case, the LCD flexible board has a board protruding portion extending in the width direction at predetermined positions at the both sides in the width direction, the LCD frame has, in the face opposite to the first case, a fixing portion for fixing the LCD, a dustproof cushion striking face formed on three faces surrounding the fixing portion, and an LCD flexible board catching face formed at a portion corresponding to the protruding portion of the LCD flexible board to support the downsize of the protruding portion so that the upside of the protruding portion continues with the dustproof cushion striking face, and the first case has a dustproof cushion set so as to contact with the face on the LCD frame formed by the dustproof cushion striking face, upside of the protruding portion and upside of the LCD flexible board.

It is also allowed that the LCD flexible board catching face has a cut for securing the protruding portion of the LCD flexible board. It is also allowed that the dustproof cushion has a function for absorbing an impact.

It is also allowed that the first case has a screen attaching portion on the surface and a dustproof cushion attaching portion on the back and a screen is attached to the screen attaching portion to serve as a display face.

An electronic apparatus of the present invention has the above LCD dustproof structure. It is allowed that an electronic apparatus is a cellular phone and the cellular phone is foldaway.

The present invention has an advantage that the number of components and assembling man-hours can be decreased. This is because the dustproof cushion serves as an impact absorbing cushion and thereby, the number of impact absorbing cushions can be decreased.

Moreover, there is an advantage that dustproof can be realized without imposing a burden on internal components or without being influenced by the fluctuation of the internal components. This is because a configuration of compressing a dustproof cushion only between a front case having a relatively-high rigidity and an LCD frame is used and no burden is imposed on other components.

BRIEF DESCRIPTION OF THE DRAWINGS

FIG. 1 is a schematic perspective view of a foldaway cellular phone of an embodiment of the present invention;

FIGS. 4A and 4B are schematic views showing a state in which an LCD body and an LCD flexible board are mounted on an LCD frame, in which FIG. 4A is a top view and FIG. 4B is an A—A sectional view of FIG. 4A.

DETAILED DESCRIPTION OF THE PREFERRED EMBODIMENTS

Figure 3:
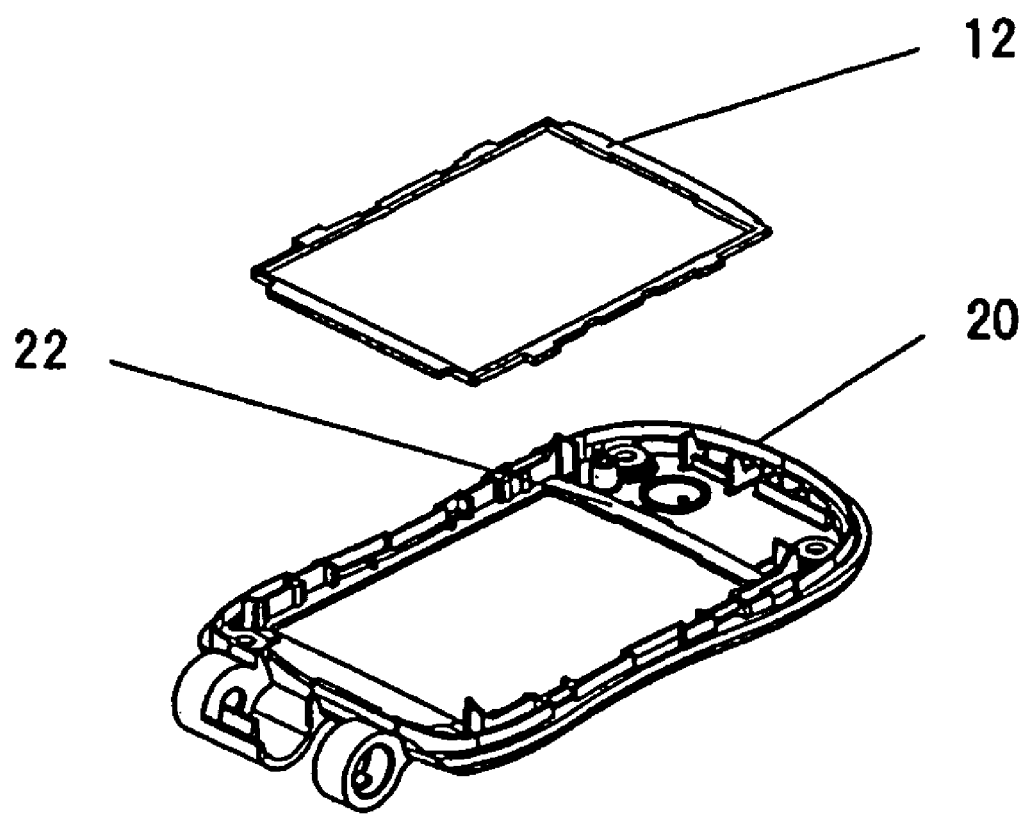
FIG. 3 is a schematic perspective view when viewing the front case and the dustproof cushion in FIG. 2 from their backs.
Figure 4A:
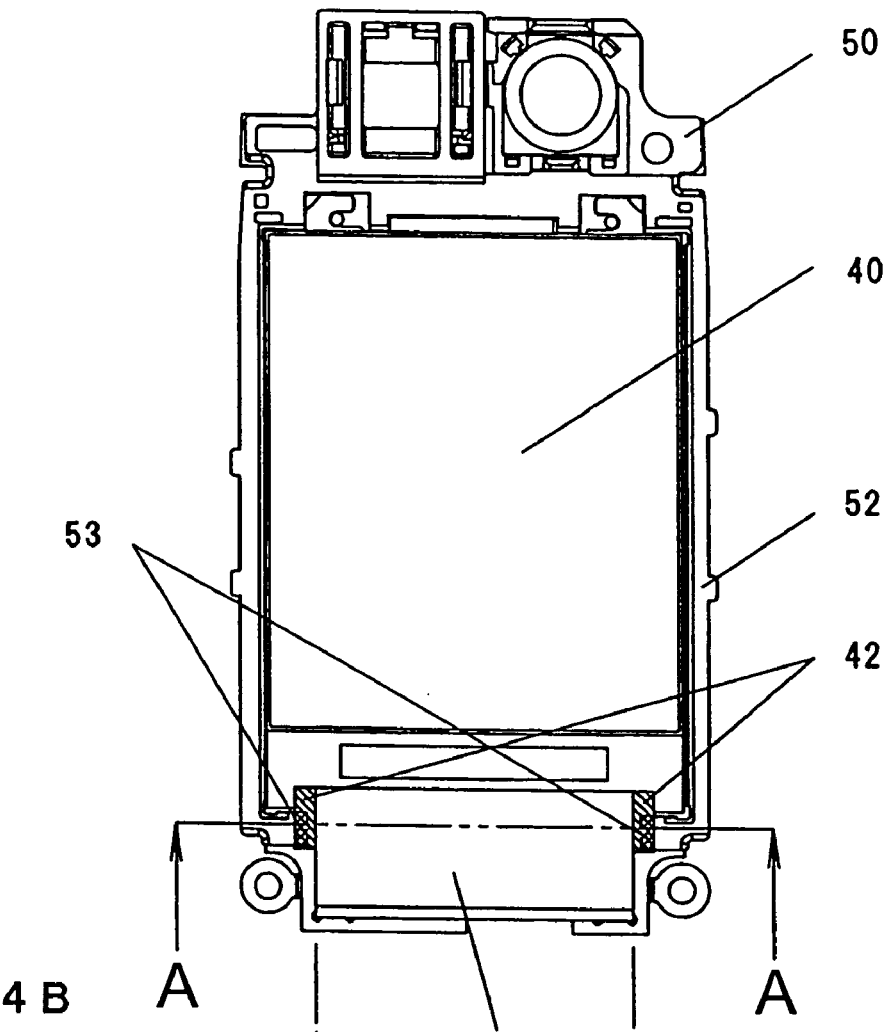
Figure 4B:
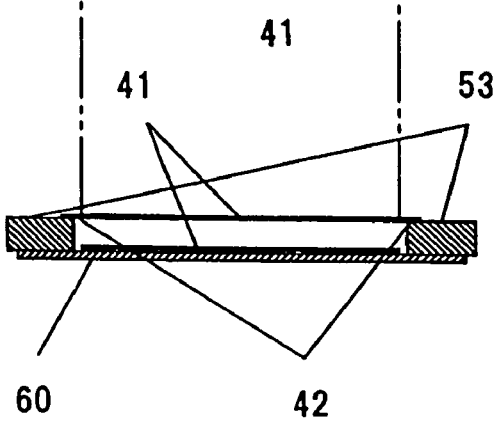

Then, embodiments of the present invention are described below by referring to the accompanying drawings. FIG. 1 is a schematic perspective view of a foldaway cellular phone of an embodiment of the present invention, FIG. 2 is a schematic exploded perspective view of the upper housing in FIG. 1, FIG. 3 is a schematic perspective view when viewing the front case and dustproof cushion in FIG. 2 from their backs, and FIGS. 4A and 4B are schematic views showing a state in which an LCD body and an LCD flexible board are mounted on an LCD frame, in which FIG. 4A is a top view and FIG. 4B is an A—A sectional view of FIG. 4A.

In this case, a foldaway cellular phone 1 is described as an example as shown in FIG. 1. The foldaway cellular phone 1 is constituted by an upper housing 2, lower housing 3, hinge connecting portion 4 for connecting the upper housing 2 with the lower housing 3 so that they can be foldaway, and external antenna 7. A display 5 for displaying a picture is set to the upper housing 2 and a key button 6 for inputting character information and control information is set to the lower housing.

Figure 2:
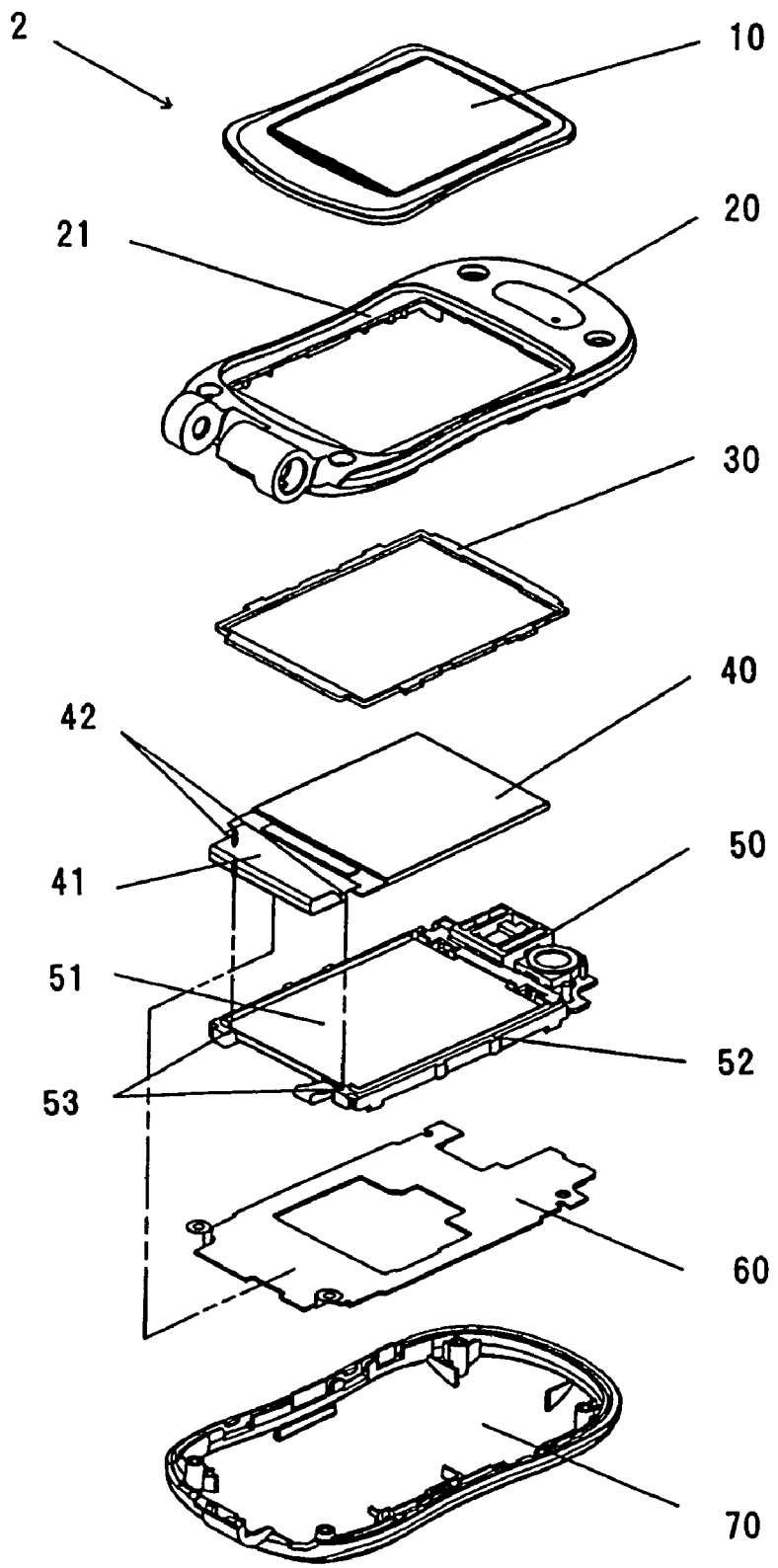
FIG. 2 is a schematic exploded perspective view of the upper housing in FIG. 1.

As shown in FIG. 2, the upper housing 2 has a screen 10, front case 20, dustproof cushion 30, LCD body 40, LCD frame 50, printed wiring board 60, and rear cover 70.

The front case 20 has a screen attaching portion 21 on the surface and a dustproof cushion attaching portion 22 on the back, the screen 10 is attached to the screen attaching portion 21, and the dustproof cushion 30 is attached to the dustproof cushion attaching portion 22.

The LCD frame 50 has an LCD fixing portion 51, cushion striking portion 52, and LCD flexible board catching face 53 on the upside and the LCD flexible board catching face 53 forms a face engaged with the downside of the board protruding portion 42 of an LCD flexible board 41. Because the LCD flexible board 41 generally has a small thickness, the thickness of a board protruding portion 42 is also small, and a step can be covered by the dustproof cushion 30. Therefore, in FIG. 4, the LCD flexible board catching face 53 contacting with the downside of the board protruding portion 42 has the same height as the cushion striking face 52. However, when the thickness of the board protruding portion 42 is large, it is also allowed to form a cut so that the upside of the board protruding portion 42 becomes the same height as the cushion striking face 52 and set the LCD flexible board catching face 53 as the bottom of the cut.

The LCD body 40 is fixed to the LCD fixing portion 51, the dustproof cushion 30 attached to the front case 20 contacts with the cushion striking portion 52 when assembled, the downside of the board protruding portion 42 of the LCD flexible board 41 contacts with the LCD flexible board catching face 53, and the upsides of the board protruding portion 42 and LCD flexible board 41 become planes continued with the face of the cushion striking portion 52.

The LCD body 40 and printed circuit board 60 are mutually connected by the LCD flexible board 41 folded back at the tip of the board protruding portion 42 contacting with the LCD flexible board catching face 53.

The dustproof cushion 30 is held between the LCD frame 50 and the front case 20 when assembled to secure the closed stage between them. The rear cover 70 is engaged with the front case 20 to constitute a housing and the screen 10 is set to the front case 20 to become the display 5.

This embodiment has a feature that the board protruding portion 42 extending to right and left in the width direction is set to the LCD flexible board 41, the LCD flexible board catching face 53 contacting and engaged with the downsize of the board protruding portion 42 of the LCD flexible board 41 is formed on the LCD frame 50, and the upside of the board protruding portion 42 of the LCD flexible board 41 becomes a plane continued with the face of the cushion striking portion 52 when assembled. Because the thickness of the LCD flexible board 41 is small, a step between the upside of the board protruding portion 42 and the cushion striking portion 52 is covered with the flexibility of the dustproof cushion 30. If the thickness is large, it is allowed to form a cutout and eliminate the step from the upside. Because the LCD flexible board 41 is also thin, it is bent. However, because the board 41 is folded back at the front of it, it has a rigidity and its deflection is covered with the flexibility of the dustproof cushion 30.

Thus, dustproof of the space between the screen 10 and the LCD body 40 can be secured only by the dustproof cushion 30 and at the same time, the dustproof cushion 30 serves as an impact absorbing cushion.

Then, assembling of the upper housing 2 of the foldaway cellular phone of this embodiment is described below. The LCD flexible board 41 is connected to the printed wiring board 60 and the LCD body 40 is fixed to the LCD fixing portion 51 of the LCD frame 50 so that the board protruding portion 42 contacts with the LCD flexible board catching face 53 of the LCD frame 50. Then, by folding back the LCD flexible board 41 and fixing the printed wiring board 60 to the downside of the LCD frame 50, an LCD unit is completed.

After attaching the dustproof cushion 30 to the dustproof cushion attaching portion 22 at the downside of the front case 20, the LCD unit is built in the front case 20 so that the dustproof cushion 30 contacts with the cushion striking face 52 of the LCD frame 50 and the upside of the LCD flexible board 41 including the board protruding portion 42. The rear cover 70 is fitted to the front case 20 and the screen 10 is attached to the screen attaching portion 21 of the front case 20 to complete the upper housing 2.

Then, functions of the LCD dustproof structure of this embodiment are described below. The square dustproof cushion 30 contacts on the cushion striking face 52 of the LCD frame 50, board protruding portion 42 supported by the LCD flexible board catching face 53, and the LCD flexible board 41 over a circuit. Therefore, by compressing the dustproof cushion 30 between the front case 20 and the LCD frame 50, the closed state of the display portion between the screen 10 and the LCD body 40 can be secured.

A foldaway cellular phone is described above as an example. But a cellular phone is not restricted to the foldaway cellular phone. It is also allowed to use an integrated cellular phone and other electronic apparatuses which can be widely used as the dustproof structure of an LCD for performing display by an LCD.

What is claimed is:

1. An LCD dustproof structure of an electronic apparatus including a first case having a display face and an LCD and a second case engaged with the first case to form a housing, wherein an LCD frame that carries the LCD, a printed wiring board having an electronic component and a wiring for controlling the LCD, and an LCD flexible board for connecting the LCD with the printed wiring board is fixed to the first case, the LCD flexible board has a board protruding portion extending in the width direction at predetermined positions of the both sides in the width direction, the LCD frame has, in the face opposite to the first case, a fixing portion for fixing the LCD, a dustproof cushion striking face formed on three faces surrounding the fixing portion, and an LCD flexible board catching face formed at a portion corresponding to the protruding portion of the LCD flexible board to support the bottom of the protruding portion so that the upside of the protruding portion continues with the dustproof cushion striking face, and the first case has a dustproof cushion set so as to contact with the face on the LCD frame formed by the dustproof cushion striking face, upside of the protruding portion, and upside of the LCD flexible board.

2. The LCD dustproof structure of an electronic apparatus according to claim 1, wherein
the LCD flexible board catching face has a cut for securing the protruding portion of the LCD flexible board.

3. The LCD dustproof structure of an electronic apparatus according to claim 1, wherein
the dustproof cushion has a function for absorbing an impact.

4. The LCD dustproof structure of an electronic apparatus according to claim 1, wherein
the first case has a screen attaching portion on the surface and a dustproof cushion attaching portion on the back, and a screen is attached to the screen attaching portion to serve as the display face.

5. An electronic apparatus including a first case having a display face and an LCD and a second case engaged with the first case to form a housing, wherein
an LCD frame that carries the LCD, a printed wiring board having an electronic component and a wiring for controlling the LCD, and an LCD flexible board for connecting the LCD with the printed wiring board is fixed to the first case,
the LCD flexible board has a board protruding portion extending in the width direction at predetermined positions at the both sides in the width direction,
the LCD frame has, in the face opposite to the first case, a fixing portion for fixing the LCD, a dustproof cushion striking face formed at three faces surrounding the fixing portion, and an LCD-flexible-board catching face formed at a portion corresponding to the protruding portion of the LCD flexible board to support the downside of the protruding portion so that the upside of the protruding portion continues with the dustproof cushion striking face, and
the first case has a dustproof cushion set so as to contact with the face on the LCD frame formed by the dustproof cushion striking face, upside of the protruding portion, and upside of the LCD flexible board.

6. The electronic apparatus according to claim 5, wherein
the LCD flexible board catching face has a cut for securing the protruding portion of the LCD flexible board.

7. The electronic apparatus according to claim 5, wherein
the dustproof cushion has a function for absorbing an impact.

8. The electronic apparatus according to claim 5, wherein
the first case has a screen attaching portion on the surface and a dustproof cushion attaching portion on the back and a screen is attached to the screen attaching portion to serve as the display face.

9. The electronic apparatus according to claim 5, wherein
the electronic apparatus is a cellular phone.

10. The electronic apparatus according to claim 9, wherein
the cellular phone is foldaway.

* * * * *